United States Patent
Lee et al.

(10) Patent No.: US 12,487,938 B2
(45) Date of Patent: Dec. 2, 2025

(54) STORAGE DEVICE, CONTROLLER, AND OPERATING METHOD OF CONTROLLER, CAPABLE OF IMPROVING EFFICIENCY OF PROGRAM MODE

(71) Applicant: SK hynix Inc., Icheon (KR)

(72) Inventors: Joo Young Lee, Icheon (KR); Hoe Seung Jung, Icheon (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 18/465,882

(22) Filed: Sep. 12, 2023

(65) Prior Publication Data

US 2024/0345960 A1    Oct. 17, 2024

(30) Foreign Application Priority Data

Apr. 11, 2023    (KR) .................. 10-2023-0047387

(51) Int. Cl.
*G06F 12/0877*    (2016.01)

(52) U.S. Cl.
CPC ............................ *G06F 12/0877* (2013.01)

(58) Field of Classification Search
None
See application file for complete search history.

(56) References Cited

U.S. PATENT DOCUMENTS

| | | | |
|---|---|---|---|
| 2021/0271603 A1* | 9/2021 | Um | G06F 13/1673 |
| 2022/0223216 A1 | 7/2022 | Zhao et al. | |
| 2022/0374163 A1* | 11/2022 | Colella | G06F 3/0608 |
| 2023/0343397 A1* | 10/2023 | Hsu | G11C 16/32 |

* cited by examiner

*Primary Examiner* — Baboucarr Faal

(57) ABSTRACT

According to embodiments of the present disclosure, if write operations for a memory block with efficient write operations according to a cache program mode and a memory block with a different property are mixed, the write operation is performed by switching the cache program mode to a normal program mode. Accordingly, it is possible to prevent or reduce performance degradation of the cache program mode due to a workload in which write operations of different property are mixed, thereby improving write operation efficiency.

19 Claims, 6 Drawing Sheets

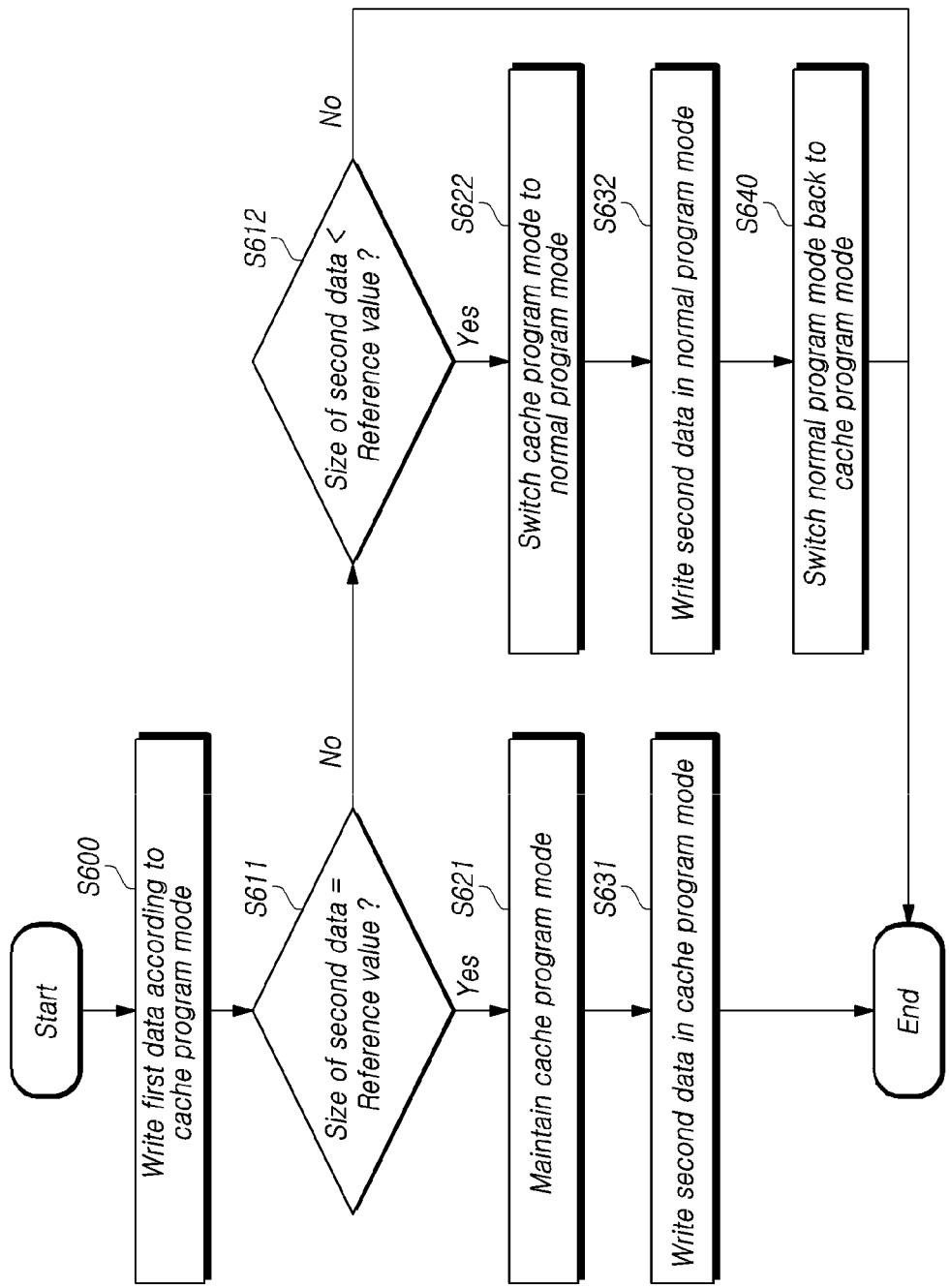

STORAGE DEVICE, CONTROLLER, AND OPERATING METHOD OF CONTROLLER, CAPABLE OF IMPROVING EFFICIENCY OF PROGRAM MODE

CROSS-REFERENCE TO RELATED APPLICATION

The present application claims priority under 35 U.S.C. 119 (a) to Korean patent application number 10-2023-0047387 filed on Apr. 11, 2023, which is incorporated herein by reference in its entirety.

TECHNICAL FIELD

Embodiments of the present disclosure relate to a storage device, a controller, and an operating method of the controller, capable of improving the efficiency of a program mode.

BACKGROUND

A storage device may include a memory including a plurality of memory cells and storing data. In addition, the storage device may include a controller which controls an operation of writing data to the plurality of memory cells included in the memory or reading or deleting data stored in the plurality of memory cells.

The controller may write data in the memory according to a command input from the outside. The controller may receive various commands from the outside or write various types of data in the memory. Therefore, there may be a problem in that operational efficiency of the controller and the memory may decrease while a write operation is performed according to the various commands or a write operation for the various types of data is performed.

SUMMARY

Embodiments of the present disclosure provide a configuration capable of improving the efficiency of a program operation controlled by a controller in various workloads according to an operation of writing data to a memory or a type of data written to the memory.

In one aspect, embodiments of the present disclosure may provide a storage device including a memory including a plurality of memory cells, and a controller configured to write data to the memory according to a first program mode, determine whether to switch the first program mode to a second program mode based on a comparison result between a size of a first next data to be written in the memory and a preset reference value, and write the first next data to the memory according to the determined program mode.

In another aspect, embodiments of the present disclosure may provide a controller including a program mode setting module configured to compare a size of data to be written to a memory with a reference value, and set a program mode in which the data is written to the memory as a cache program mode or a normal program mode based on a comparison result, and a program control module configured to control an operation of writing the data to the memory according to a program mode set by the program mode setting module.

In another aspect, embodiments of the present disclosure may provide an operating method of a controller including writing first data to a memory according to a cache program mode, comparing a size of second data to be written to the memory after writing the first data with a reference value, switching the cache program mode to a normal program mode if the size of the second data is smaller than the reference value, and writing the second data to the memory according to the normal program mode.

According to embodiments of the present disclosure, since the program mode of the controller may be controlled based on the workload of writing data to the memory, it is possible to improve the efficiency of the program operation controlled by the controller depending on the workload.

BRIEF DESCRIPTION OF THE DRAWINGS

FIG. 6 is a flowchart illustrating an operating method of a controller according to an embodiment of the present disclosure.

DETAILED DESCRIPTION

Figure 1:
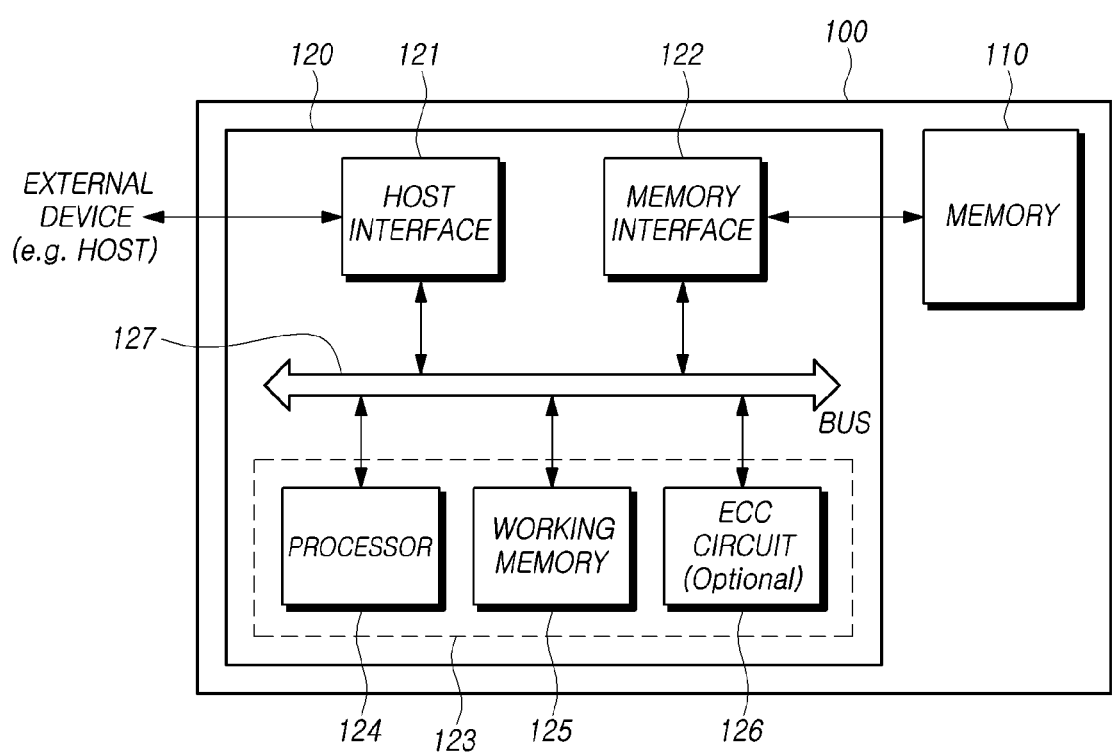
FIG. 1 is a schematic diagram illustrating a storage device according to an embodiment of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including," "having," "containing," "constituting," "make up of," and "formed of" used herein are generally intended to allow other components to be added unless the terms are used with the term "only." As used herein, singular forms are intended to include plural forms unless the context clearly indicates otherwise.

Terms, such as "first," "second," "A," "B," "(A)," or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap," etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can."

Hereinafter, various embodiments of the present disclosure will be described in detail with reference to accompanying drawings.

FIG. 1 is a schematic diagram illustrating a storage device 100 according to an embodiment of the present disclosure.

Referring to FIG. 1, the storage device 100 may include a memory 110 for storing data, and a controller 120 for controlling the memory 110.

The memory 110 may include a plurality of memory blocks and may operate under the control of the controller 120. An operation of the memory 110 may include a read operation, a program operation (also referred to as a "write operation"), and an erase operation.

The memory 110 may include a memory cell array including a plurality of memory cells (also referred to simply as "cells") storing data. Such a memory cell array may exist in a memory block.

Each of a plurality of memory cells included in the memory 110 may store at least 1-bit of data. For example, the memory cell may be a single-level cell (SLC) which stores 1-bit data. Alternatively, the memory cell may be a multi-level cell (MLC) storing 2-bit data, a triple-level cell (TLC) storing 3-bit data, or a quad-level cell (QLC) storing 4-bit data. In addition, in some cases, the number of bits of data stored in each memory cell may be dynamically determined. For example, a single-level cell storing 1-bit data may be changed to a triple-level cell storing 3-bit data.

The memory 110 may be implemented in a variety of types of a NAND flash memory, a 3D NAND flash memory, a NOR flash memory, a resistive RAM, a phase change memory, a magneto-resistive memory, a ferroelectric memory, or a spin injection magnetization inversion memory.

Meanwhile, the memory 110 may be implemented in a three-dimensional array structure. Embodiments of the present disclosure may be applied not only to a flash memory in which a charge storage layer is composed of a conductive floating gate, but also to a flash memory of a charge trap type (CTF) in which a charge storage layer is composed of an insulating film.

The memory 110 may receive a command and an address from the controller 120 and access an area selected by the address in the memory cell array. The memory 110 may perform an operation indicated by the command on the area selected by the address.

For example, the memory 110 may perform a program operation, a read operation, and an erase operation.

When performing the program operation, the memory 110 may program data in the area selected by the address. When performing the read operation, the memory 110 may read data from the area selected by the address. When performing the erase operation, the memory 110 may erase data stored in the area selected by the address.

The controller 120 may control write (or program), read, erase, and background operations of the memory 110. The background operations may include one or more of garbage collection (GC), wear leveling (WL), read reclaim (RR), and bad block management (BBM) operations.

The controller 120 may control an operation of the memory 110 according to a request of an external device (e.g., a host HOST) located outside the storage device 100. In addition, the controller 120 may control the operation of the memory 110 regardless of a request from the host HOST.

The host may be a computer, UMPC (Ultra Mobile PC), workstation, PDA (Personal Digital Assistants), tablet, mobile phone, smartphone, e-book, PMP (Portable Multimedia Player), portable game device, a navigation device, a black box, a digital camera, a DMB (Digital Multimedia Broadcasting) players, smart televisions, digital voice recorders, digital voice players, digital video recorders, digital video players, digital video recorders, digital video players, storage constituting data centers, one of various electronic devices constituting a home network, one of various electronic devices constituting a computer network, one of various electronic devices constituting a telematics network, an RFID (Radio Frequency IDentification) device, and a mobile device (e.g., a vehicle, a robot, a drone) capable of driving under human control or autonomous driving.

The host may include at least one operating system. The operating system may manage and control overall functions and operations of the host and provide mutual operations between the host and the storage device 100. The operating system may be divided into a general operating system and a mobile operating system depending on the mobility of the host.

The controller 120 and the host may be separate devices. In some cases, the controller 120 and the host may be implemented as an integrated device. In the following, for convenience of explanation, it will be described an example in which the controller 120 and the host are separate devices.

Referring to FIG. 1, the controller 120 may include a memory interface 122, a control circuit 123, and the like, and may further include a host interface 121.

The host interface 121 provides an interface for communication with the host. For example, the host interface 121 may provide an interface using at least one of an universal serial bus (USB) protocol, a multimedia card (MMC) protocol, a peripheral component interconnection (PCI) protocol, a PCI-express (PCI-E) protocol, and an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a system management bus (SMBus) protocol, an inter-integrated circuit (I2C) protocol, an improved inter-integrated circuit (I3C) protocol, and a private protocol.

When receiving a command from the host, the control circuit 123 may receive the command through the host interface 121 and perform an operation of processing the received command.

The memory interface 122 may be connected to the memory 110 to provide an interface for communication with the memory 110.

The memory interface 122 may be configured to provide an interface between the memory 110 and the controller 120 under the control of the control circuit 123.

The control circuit 123 may control the operation of the memory 110 by performing overall control operations of the controller 120. For example, the control circuit 123 may include one or more of a processor 124, a working memory 125, and the like, and may optionally include an error detection and correction circuit (ECC Circuit) 126 and the like.

The processor 124 may control overall operations of the controller 120 and perform logical operations. The processor 124 may communicate with the host through the host interface 121 and may communicate with the memory 110 through the memory interface 122.

The processor 124 may perform a function of a flash translation layer (FTL). The processor 124 may convert a logical block address (LBA) provided by the host into a physical block address (PBA) through the flash translation layer (FTL). The flash translation layer (FTL) may receive the logical block address (LBA) and convert it into a physical block address (PBA) using a mapping table.

There are various methods of address mapping of the flash translation layer according to mapping units. The address mapping methods may include a page mapping method, a block mapping method, and a mixed mapping method.

The processor 124 may randomize data received from the host. For example, the processor 124 may randomize the data received from the host using a preset randomizing seed. Randomized data may be provided to the memory 110 and programmed into a memory cell array of the memory 110.

The processor 124 may derandomize data received from the memory 110 during a read operation. For example, the processor 124 may derandomize the data received from the memory 110 using a derandomizing seed. The derandomized data may be output to the host.

The processor 124 may control the operation of the controller 120 by executing firmware. The processor 124 may execute (or drive) firmware loaded into the working memory 125 during booting in order to control the overall operation of the controller 120 and perform logical operations. Hereinafter, an operation of the storage device 100 described in embodiments of the present disclosure may be implemented in a manner in which the processor 124 executes firmware defining a corresponding operation.

The firmware may be a program executed in the storage device 100 to drive the storage device 100, and may include various functional layers. For example, the firmware may include binary data defining codes for executing each of the aforementioned functional layers.

For example, the firmware may include at least one of a flash translation layer (FTL) for performing a conversion function between a logical address provided by the host and a physical address of the memory 110, a host interface layer (HIL) for interpreting a command provided by the host and delivering it to the flash translation layer (FTL), and a flash interface layer (FIL) for transferring commands instructed by the flash translation layer (FTL) to the memory 110.

Such firmware may be loaded into the working memory 125 from the memory 110 or from a separate memory (e.g., ROM, NOR Flash) located outside the memory 110. When executing a booting operation after power-on, the processor 124 may first load all or part of the firmware into the working memory 125.

The processor 124 may perform logic operations defined in the firmware loaded in the working memory 125 to control the overall operation of the controller 120. The processor 124 may store a result of performing a logic operation defined in the firmware in the working memory 125. The processor 124 may control the controller 120 to generate a command or signal according to a result of performing a logic operation defined in the firmware. If the part of the firmware defining the logic operation to be performed is not loaded in the working memory 125, an event (e.g., interrupt) for loading the corresponding part of the firmware into the working memory 125 may be created.

Meanwhile, the processor 124 may load meta data necessary for driving the firmware from the memory 110. The meta data is data for managing the memory 110 and may include management information about user data stored in the memory 110.

Meanwhile, the firmware may be updated while the storage device 100 is being produced or while the storage device 100 is running. The controller 120 may download new firmware from the outside of the storage device 100 and update the existing firmware to the new firmware.

The working memory 125 may store firmware, program codes, commands, or data required to operate the controller 120. The working memory 125, as a volatile memory, may include one or more of a static RAM (SRAM), a dynamic RAM (DRAM), and a synchronous DRAM (SDRAM).

The error detection and correction circuit 126 may detect an error bit of target data using an error correction code and correct the detected error bit. The target data may be data stored in the working memory 125 or data read from the memory 110.

The error detection and correction circuit 126 may be implemented to decode data with an error correction code. The error detection and correction circuit 126 may be implemented with a variety of code decoders. For example, a decoder performing non-systematic code decoding or a decoder performing systematic code decoding may be used.

For example, the error detection and correction circuit 126 may detect an error bit in units of sectors set for each of the read data. Each read data may be composed of a plurality of sectors. A sector may refer to a data unit smaller than a page, which is a read unit of a flash memory. Sectors constituting each read data may correspond to each other by using an address.

The error detection and correction circuit 126 may calculate a bit error rate (BER) and determine the possibility of correction in units of sectors. For example, the error detection and correction circuit 126 may determine that the corresponding sector is uncorrectable or failed if the bit error rate is higher than a set reference value. On the other hand, if the bit error rate is lower than the reference value, the corresponding sector may be determined to be correctable or passed.

The error detection and correction circuit 126 may sequentially perform error detection and correction operations on all read data. If a sector included in read data is correctable, the error detection and correction circuit 126 may skip an error detection and correction operation for a corresponding sector for next read data. If the error detection and correction operations for all read data are completed in this way, the error detection and correction circuit 126 may detect sectors determined to be uncorrectable until the end. The number of sectors determined to be uncorrectable may be one or more. The error detection and correction circuit 126 may transfer information (e.g., address information) on a sector determined to be uncorrectable to the processor 124.

A bus 127 may be configured to provide a channel between components 121, 122, 124, 125, and 126 of the controller 120. The bus 127 may include a control bus for transferring various control signals, commands, and the like, and a data bus for transferring various data.

Meanwhile, some of the above-described components 121, 122, 124, 125, and 126 of the controller 120 may be deleted, or some of the above-described components 121, 122, 124, 125 and 126 may be integrated into one element. In some cases, one or more other components may be added in addition to the above-described components of the controller 120.

The controller 120 may perform an operation of programming data in the memory 110 using various modes. The controller 120 according to embodiments of the present disclosure may improve the efficiency of a program operation by switching a program mode according to data programmed in the memory 110.

Figure 2:
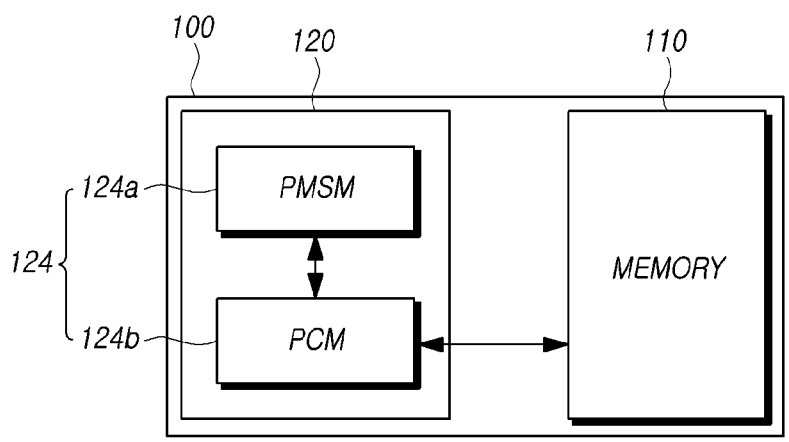
FIG. 2 illustrates a processor included in a controller of a storage device according to an embodiment of the present disclosure.

FIG. 2 illustrates a processor 124 included in a controller 120 of a storage device 100 according to an embodiment of the present disclosure.

Referring to FIG. 2, the controller 120 of the storage device 100 may include a program mode setting module (PMSM) 124a and a program control module (PCM) 124b. The program mode setting module 124a and the program control module 124b may be part of the processor 124, and they may be configured separately or may be implemented in an integrated form in some cases.

The program mode setting module 124a may set a program mode for writing data to a memory 110. For example, the program mode setting module 124a may set the program mode to one of a cache program mode and a normal program mode. In this disclosure, the cache program mode may be referred to as a "first program mode" and the normal program mode may be referred to as a "second program mode."

According to the program mode set by the program mode setting module 124a, the program control module 124b may perform an operation of writing data to the memory 110.

The program mode setting module 124a may set one of the cache program mode and the normal program mode as a default program mode.

In the cache program mode, second data may be input during a period in which first data is programmed into the memory 110, the second data being input after the first data. That is, a data input time of the second data overlaps with the program period of the first data. Therefore, the data input time overlapping with the program period may reduce a total process time.

In the normal program mode, second data may be input after a period in which first data is programmed into the memory 110. Therefore, the total process time may not be reduced, but a length of the program period in the normal program mode may be shorter than a length of the program period in the cache program mode.

The program mode setting module 124a may set the cache program mode, which may provide a processing speed advantage, as the default program mode.

For example, when the controller 120 receives a write boost command, which is a command for writing data at a high processing speed of a single-level cell level, from the host HOST, since the cache program mode is set as the default program mode by the program mode setting module 124a, the program control module 124b may perform a program operation according to the write boost command in the cache program mode. Since the program operation is performed in the cache program mode, the speed of the program operation may be improved.

The program mode setting module 124a may change or switch the program mode based on an attribute or a property of a command input from the outside, a type of data to be written, a property of a memory block in which data is to be written, and the like.

For example, the program mode setting module 124a may switch the cache program mode to the normal program mode in a workload in which writing for a first block in which the data is written according to the write boost command and writing for a second block having a different property from the first block are mixed. The first block may be referred to as a "write booster block."

The workload in which writing for the write booster block and writing for the second block having a different property from the write booster block are mixed may be one of a workload where the host frequently switches between write boost enable and write boost disable, a workload in which the write boost command and a command of single-level cell properties (e.g., Boot using a block different from the write boost block, RPMB, enhanced write, or the like) are mixed and delivered, a workload in which the host mixes and transmits the command of single-level cell properties and a command of a general logic unit, a workload in which writing of meta data using a different block than the write boost block is frequently occurred when writing data in a block, a workload in which meta data and user data are mixed, and a workload in which there are frequent FUA (Force Unit Access), Sync, or Cache commands.

In addition, a mixed workload to which the embodiments of the present disclosure are applied may not be limited to the above examples, and may include a certain workload in which data is stored in a block having a different property from a write boost block in which data is written by a command, such as the write boost command, requiring a fast program operation in the cache program mode, and its related commands are mixed and delivered.

As described above, in the case of occurrence of the certain workload, the program mode setting module 124a may switch the cache program mode to the normal program mode. Such a mode change is necessary to prevent performance degradation in write operations caused by the mixing of high-efficiency and low-efficiency write operations in the cache program mode.

For example, the program mode setting module 124a may determine whether to switch the program mode based on the size (or length) of data to be written in the memory 110.

The program mode setting module 124a may set the cache program mode as the default program mode, and the program control module 124b may perform an operation of writing data of a specific size to the memory 110 according to the cache program mode. The specific size may be a multi-plane size, but is not limited thereto.

The program mode setting module 124a may allow data of a specific size to be written to the memory 110 in the cache program mode, and may check the size of data to be written to the memory 110.

For example, the program mode setting module 124a may compare the size of data to be written in the memory 110 with a preset reference value. For example, the preset reference value may be a value corresponding to the multi-plane size.

The program mode setting module 124a may maintain the cache program mode if the size of data to be written in the memory 110 is equal to the preset reference value. After that, when next data is input, the program control module 124b may perform an operation of writing the next data according to the cache program mode.

On the other hand, the program mode setting module 124a may switch the cache program mode to the normal program mode if the size of data to be written in the memory 110 is smaller than the reference value.

If the size of data to be written in the memory 110 is smaller than the reference value, it may mean that the data to be written in the memory 110 is written in a block having a different property from a block in which previous data is written in the cache program mode. That is, the data to be written in the memory 110 may correspond to data, blocks, or commands that have different properties from data, a block, or commands associated with the previous data written in the cache program mode.

If the size of data to be written in the memory 110 is smaller than the reference value, the program mode setting module 124a may switch the program mode to the normal program mode so as to write data, which has a property different from a property of the data written in the cache program mode, according to the normal program mode.

If the program mode is switched to the normal program mode based on the size of data to be written in the memory 110, the program control module 124b may perform the operation of writing the next data according to the normal program mode.

The program mode setting module 124a may switch the normal program mode back to the cache program mode when the operation of writing the next data according to the normal program mode is completed, so that data following the next data may be written according to the cache program mode.

Alternatively, in some cases, the program mode setting module 124a may compare the size of data to be written in the memory 110 in the normal program mode with the preset reference value, and determine whether to switch the program mode. The program mode setting module 124a may set the program mode to the cache program mode if the size of data to be written in the memory 110 is equal to the reference value, and set the program mode to the normal program mode if the size of data to be written in the memory 110 is smaller than the reference value.

In some cases, the program mode setting module 124a may determine the program mode based on the frequency of a command instructing data writing to a memory block and/or the interval between commands.

For example, in the cache program mode, the program mode setting module 124a may compare an interval between commands for instructing data writing with a preset value.

The program mode setting module 124a may maintain the cache program mode if the interval between commands is equal to or less than the preset value. Thus, the program control module 124b may write data to a next memory block according to the cache program mode.

On the other hand, the program mode setting module 124a may change the cache program mode to the normal program mode if the interval between commands is greater than the preset value.

If the interval between commands is greater than the preset value, it indicates that the workload for the next memory block may not be heavy. In such cases, operating in the cache program mode may provide little or no benefit.

Therefore, the program mode setting module 124a may switch the cache program mode to the normal program mode if the workload for the next memory block is not heavy. The program control module 124b may write data to the next memory block according to the normal program mode.

In addition, although the above example describes data written to a single-level cell, embodiments of the present disclosure may be also applied to a case of performing an operation of writing data to a multi-level cell or a triple-level cell.

As described above, by switching the program mode based on the property or attribute of the data to be written in the memory 110, the program mode setting module 124a can prevent or minimize performance degradation resulting from the workload of writing mixed data with different properties or attributes in the cache program mode.

Figure 3:
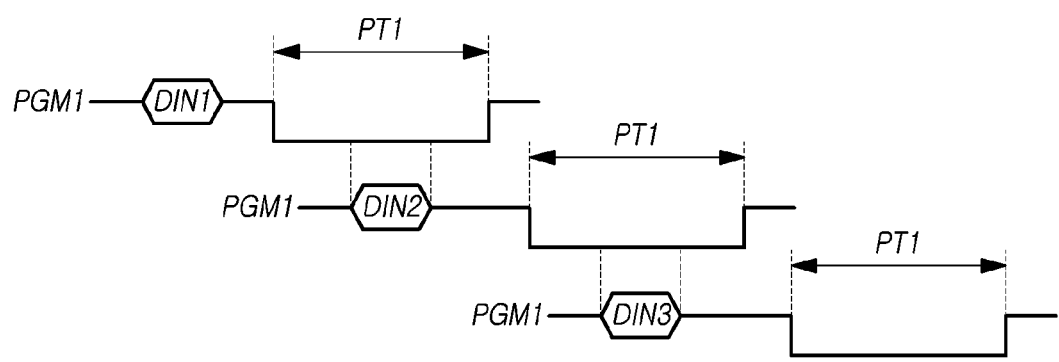
FIGS. 3 to 5 illustrate a method of writing data in a program mode according to an embodiment of the present disclosure.
Figure 4:
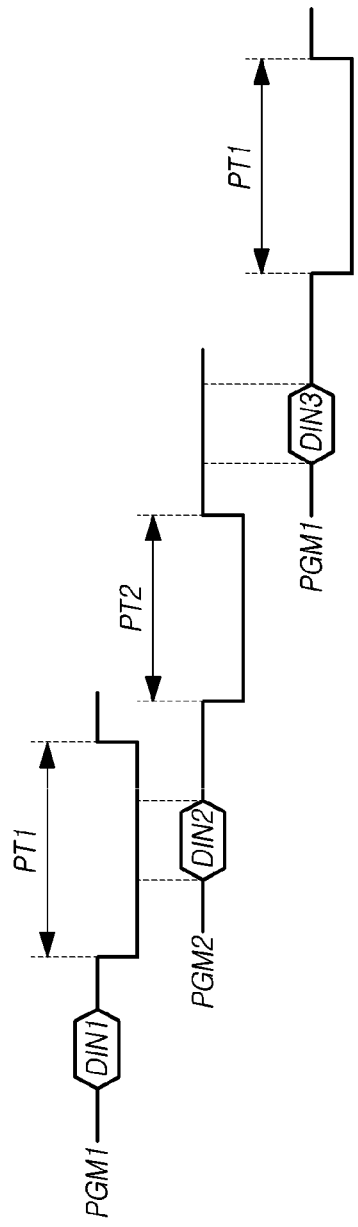
Figure 5:
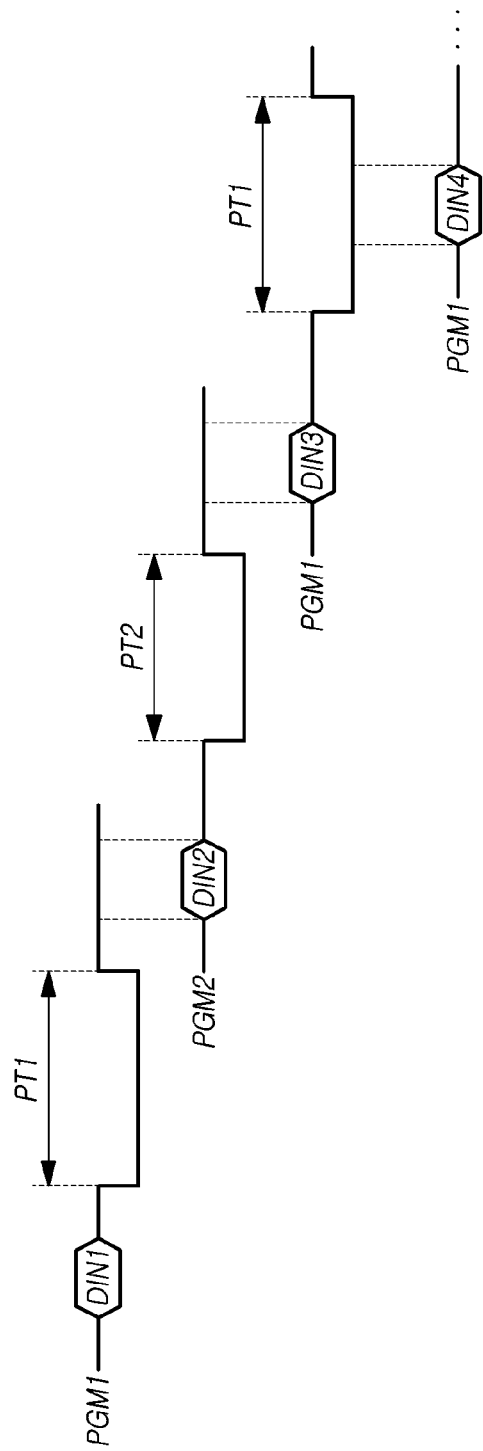

FIGS. 3 to 5 illustrate a method of writing data in a program mode according to an embodiment of the present disclosure. The method will be described with reference to FIG. 2.

Referring to FIGS. 2 and 3, the default program mode may be set to a first program mode PGM1 by the program mode setting module 124a. The first program mode PGM1 may be the cache program mode.

In the first program mode PGM1, a program operation for first data DIN1 may be performed during a first program period PT1.

Since the program operation of writing the first data DIN1 in the memory 110 is performed according to the first program mode PGM1, second data DIN2 may be input during the first program period PT1 during which the program operation for the first data DIN1 is performed.

The program mode setting module 124a may compare the size of the second data DIN2 with the preset reference value. The program mode setting module 124a may maintain the program mode as the first program mode PGM1 if the size of the second data is equal to the reference value. Therefore, the second data DIN2 may be programmed according to the first program mode PGM1. The program operation for the second data DIN2 may be performed during the first program period PT1.

Third data DIN3 may be input during the first program period PT1 during which the program operation for the second data DIN2 is performed.

The program mode setting module 124a may maintain the program mode as the first program mode PGM1 if the size of the third data DIN3 is equal to the reference value. Therefore, the third data DIN3 may be programmed according to the first program mode PGM1.

The operations in which the first data DIN1, the second data DIN2, and the third data DIN3, which have the same property, e.g., the same size, are programmed into the memory 110 may be performed according to the first program mode PGM1, which is the cache program mode. Accordingly, there may be provided the advantage of high processing speed by the cache program mode.

The program mode setting module 124a may switch the cache program mode to the normal program mode according to the size of data to be written in the memory 110. Hereinafter, it will be described with reference to FIG. 4.

Referring to FIG. 4, the program mode setting module 124a may set the default program mode to the first program mode PGM1, which is the cache program mode.

The first data DIN1 may be written to the memory 110 according to the first program mode PGM1.

The second data DIN2 may be input during the first program period PT1 during which the first data DIN1 is written to the memory 110.

The program mode setting module 124a may compare the size of the second data DIN2 with the preset reference value. The program mode setting module 124a may change the first program mode PGM1 to a second program mode PGM2 if the size of the second data DIN2 is smaller than the reference value. The second program mode PGM2 may be the normal program mode.

The program control module 124b may perform an operation of writing the second data DIN2 to the memory 110 according to the second program mode PGM2.

A length of a second program period PT2 of the second program mode PGM2 in which the second data DIN2 is written to the memory 110 may be shorter than a length of the first program period PT1 of the first program mode PGM1.

Data may not be input during the second program period PT2 in which the second data DIN2 is written to the memory 110.

Therefore, third data DIN3 to be written to the memory 110 may be input after the second program period PT2 during which the second data DIN2 is written to the memory 110 is over.

The program mode setting module 124a may switch the program mode from the second program mode PGM2 back to the first program mode PGM1 after the program operation for the second data DIN2 is terminated. Alternatively, the program mode setting module 124a may compare the size of the third data DIN3 with the preset reference value, and determine whether to switch the program mode according to the comparison result. For example, the program mode setting module 124a may maintain the second program mode PGM2 if the size of the third data DIN3 is smaller than the reference value, and may switch the program mode to the first program mode PGM1 if the size of the third data DIN3 is equal to the preset reference value.

If the third data DIN3 is written to the memory 110 according to the first program mode PGM1, data to be written to the memory 110 after the third data DIN3 may be input according to the first program mode PGM1. That is, the data to be written to the memory 110 after the third data DIN3 may be input during the first program period PT1 in which the third data DIN3 is written to the memory 110. The program mode setting module 124a may switch the program mode by comparing the size of the data to be written to the memory 110 with the reference value and determining whether to switch the program mode.

In addition, as another example, data to be written according to the second program mode PGM2 may be input after the first program period PT1 of the first program mode PGM1 is over. Hereinafter, it will be described with reference to FIG. 5.

Referring to FIG. 5, a write operation on first data DIN1 may be performed according to the first program mode PGM1.

The program mode setting module 124a may compare the size of second data DIN2 to be written in the memory 110 after writing the first data DIN1 with the preset reference value. The program mode setting module 124a may switch the program mode to the second program mode PGM2 if the size of the second data DIN2 is smaller than the reference value. Alternatively, the program mode setting module 124a may switch the program mode to the second program mode PGM2 if an interval between a command instructing writing of the second data DIN2 and a command instructing the writing of the first data DIN1 is greater than a preset value.

The second data DIN2 written to the memory 110 according to the second program mode PGM2 may be input after the first program period PT1 in which the first data DIN1 is written to the memory 110 is completed. The second data DIN2 may be written to the memory 110 according to the second program mode PGM2, and a length of the second program period PT2 during which the second data DIN2 is written to the memory 110 may be shorter than a length of the first program period PT1.

The program mode setting module 124a may switch the program mode to the first program mode PGM1 after the program operation of the second data DIN2 is completed.

Third data DIN3 to be written to the memory 110 may be input after the second program period PT2 in which the second data DIN2 is written to the memory 110 is completed.

The third data DIN3 may be written to the memory 110 according to the first program mode PGM1.

Fourth data DIN4 to be written to the memory 110 may be input during the first program period PT1 in which the third data DIN3 is written to the memory 110. The fourth data DIN4 may be written to the memory 110 according to the first program mode PGM1.

Only the second data DIN2 having properties of data, a block storing the data, or a command associated with the data that are different from those of the other data DIN1, DIN3, and DIN4 may be written to the memory 110 according the second program mode PGM2, which is the normal program mode, and the first data DIN1, the third data DIN3, and the fourth data DIN4 having the same properties may be written to the memory 110 according to the first program mode PGM1, which is the cache program mode.

According to the embodiments of the present disclosure, it is possible to prevent or reduce performance degradation of the cache program mode due to a workload writing data having different properties, while maintaining an advantage in processing speed by the cache program mode. In addition, since the storage device operates in the normal program mode in the case that the workload for writing data to the memory block is not heavy, it is possible to perform an operation of writing the data to the memory block while reducing the cases where the benefits of the cache program mode are not provided.

FIG. 6 is a flowchart illustrating an operating method of a controller 120 according to an embodiment of the present disclosure. The operating method of FIG. 6 will be described with reference to FIG. 1.

Referring to FIG. 6, the controller 120 may perform an operation of writing first data to the memory 110 according to the cache program mode, which is a default program mode (S600).

After that, when second data is input, the controller 120 may compare a length (or size) of the second data to be written in the memory 110 with a preset reference value. If the length of the second data to be written in the memory 110 is equal to the reference value (S611), the controller 120 may maintain the program mode as the cache program mode (S621).

The controller 120 may perform an operation of writing the second data to the memory 110 according to the cache program mode (S631).

In this case, it is assumed that the second data has the same property as the first data and the second data is written to a memory block having the same property as a memory block where the first data is stored. Since the second data is written to the memory 110 according to the cache program mode, there may provide an advantage in processing speed of the cache program mode.

On the other hand, if the length of the second data to be written in the memory 110 is smaller than the reference value (S612), the controller 120 may switch the cache program mode to the normal program mode (S622). Alternatively, in some cases, the controller 120 may switch the cache program mode to the normal program mode if an interval between a command for instructing the writing of the second data in the memory 110 and a command for instructing writing of the first data is greater than a preset value.

If the length of the second data is smaller than the reference value, it means that the property of the second data or the property of the memory block storing the second data is different from the property of the first data written by the cache program mode or the property of the memory storing the first data, respectively.

If the interval between the commands is greater than the preset value, it means that the workload for writing the second data is not heavy. That is, the program mode may be switched to the normal program mode if the program operations of data having different properties are mixed in the workload or the workload is not heavy, so that it is possible to prevent or reduce the performance degradation or a failure to provide the benefits of the cache program mode.

The controller 120 may perform an operation of writing the second data to the memory 110 according to the normal program mode (S632).

When the writing of the second data is completed, the controller 120 may switch the program mode from the normal program mode to the cache program mode again (S640). Therefore, an operation of writing data at a high processing speed may be performed by the cache program mode.

As described above, according to the embodiments of the present disclosure, in the case of a mixed workload in which data, commands thereof, and/or memory blocks in which the data is written, which have different properties, are mixed, a program operation of writing the data may be performed by switching between the cache program mode and the normal program mode.

Therefore, it is possible to maintain or improve the performance of the program operation according to the cache program mode by preventing or reducing the efficiency degradation of the program operation according to the cache program mode due to the mixed workload.

According to the embodiments of the disclosed technology described above, an operation delay time of the memory system may be advantageously reduced or minimized. In addition, an overhead occurring in a process of calling a specific function may be advantageously reduced or minimized. Although various embodiments of the disclosed technology have been described with particular specifics and varying details for illustrative purposes, those skilled in the art will appreciate that various modifications, additions and substitutions may be made based on what is disclosed or illustrated in the present disclosure without departing from the spirit and scope of the invention as defined in the following claims.

What is claimed is:

1. A storage device comprising:
a memory including a plurality of memory cells; and
a controller configured to:
write first data to the memory according to a cache program mode;
comparing a size of second data to be written in the memory and a reference value, the second data following the first data;
determine whether to switch the cache program mode to a normal program mode based on a comparison result; and
write the second data to the memory according to the determined program mode,
wherein a program period of the cache program mode is greater than a program period of the normal program mode, and
wherein when the first data is written to the memory according to the cache program mode, the second data is input to the memory during a first program period of writing the first data, and when the first data is written to the memory according to the normal program mode, the second data is input to the memory after the first program period is over.

2. The storage device of claim 1, wherein the controller maintains the cache program mode when the size of the second data is equal to the reference value.

3. The storage device of claim 1, wherein the controller switches the cache program mode to the normal program mode when the size of the second data is smaller than the reference value.

4. The storage device of claim 1, wherein the second data is input during the program period of the cache program mode.

5. The storage device of claim 1, wherein, when the second data is written according to the normal program mode, the normal program mode is switched back to the cache program mode after the second data is written.

6. The storage device of claim 1, wherein, when the second data is written according to the normal program mode, third data to be written in the memory is input after the program period of the normal program mode in which the second data is written is completed.

7. The storage device of claim 6, wherein, when a size of the third data is equal to the reference value, the third data is written to the memory according to the cache program mode.

8. The storage device of claim 7, wherein, when the third data is written to the memory according to the cache program mode, fourth data to be written in the memory is input in the program period of the cache program mode in which the third data is written.

9. The storage device of claim 7, wherein at least one of a property of the second data, a property of an area where the second data is written, or a property of a command associated with the second data is different from a corresponding one of a property of the third data, a property of an area where the third data is written, or a property of a command associated with the third data.

10. A controller comprising:
program mode setting circuitry configured to compare a size of first data to be written to a memory with a reference value, and set a program mode in which the first data is written to the memory as a cache program mode or a normal program mode based on a comparison result between the size of the first data and the reference value; and
program control circuitry configured to control an operation of writing the first data to the memory according to the program mode set by the program mode setting circuitry,
wherein a program period of the cache program mode is greater than a program period of the normal program mode, and
wherein when previous data is written to the memory according to the cache program mode, the first data is input to the memory during a program period of writing the previous data, and when the previous data is written to the memory according to the normal program mode, the first data is input to the memory after the program period is over, the first data following the previous data.

11. The controller of claim 10, wherein the program mode setting circuitry sets the cache program mode to a default program mode, and determines, while operating in the cache program mode, whether to switch the cache program mode to the normal program mode based on the comparison result.

12. The controller of claim 10, wherein the program mode setting circuitry maintains the cache program mode when the size of the first data is equal to the reference value, and switches the cache program mode to the normal program mode when the size of the first data is smaller than the reference value.

13. The controller of claim 12, wherein the program mode setting circuitry switches the normal program mode back to the cache program mode when the operation of writing the first data to the memory according to the normal program mode is completed.

14. The controller of claim 13, wherein second data written to the memory is input in a program period in which the first data is written to the memory according the cache program mode, the second data following the first data.

15. An operating method of a controller, the operating method comprising:
   writing first data to a memory according to a cache program mode;
   comparing a size of second data, which is to be written to the memory after the first data, with a reference value;
   switching the cache program mode to a normal program mode when the size of the second data is smaller than the reference value; and
   writing the second data to the memory according to the normal program mode,
   wherein a program period of the cache program mode is greater than a program period of the normal program mode, and
   wherein when the first data is written to the memory according to the cache program mode, the second data is input to the memory during a first program period of writing the first data, and when the first data is written to the memory according to the normal program mode, the second data is input to the memory after the first program period is over.

16. The operating method of claim 15, further comprising, after writing the second data to the memory, switching the normal program mode back to the cache program mode.

17. The operating method of claim 15, wherein the second data is input to the memory during a program period of the cache program mode in which the first data is written.

18. The operating method of claim 15, wherein at least one of a property of the second data, a property of an area where the second data is written, or a property of a command associated with the second data is different from a corresponding one of a property of the first data, a property of an area where the first data is written, or a property of a command associated with the first data.

19. The operating method of claim 15, further comprising determining whether to switch the cache program mode to the normal program mode according to an interval between a command instructing the writing of the second data and a command instructing the writing of the first data.

* * * * *